Oct. 31, 1939.  K. SCHWARZ  2,178,245
SOUND RECORDING APPARATUS
Filed Jan. 30, 1937
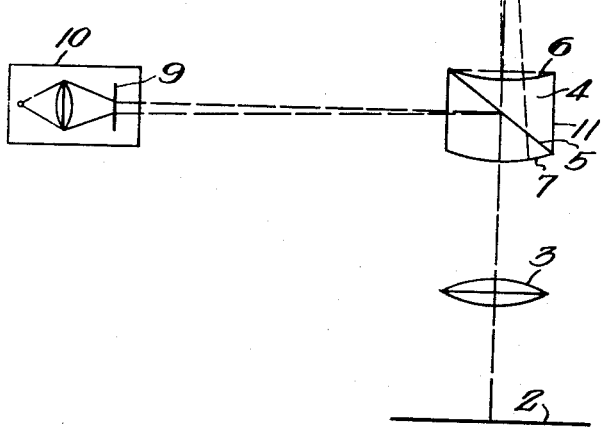
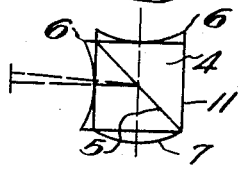
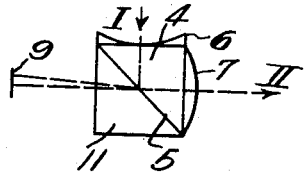
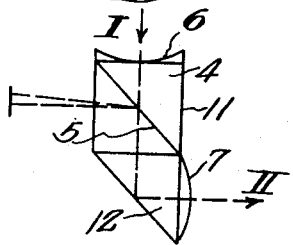
Inventor
Karl Schwarz
Attorney Patented Oct. 31, 1939

2,178,245

UNITED STATES PATENT OFFICE 2,178,245

SOUND RECORDING APPARATUS

Karl Schwarz, Berlin, Germany, assignor to Klangfilm G. m. b. H., Berlin, Germany, a corporation of Germany Application January 30, 1937, Serial No. 123,103
In Germany June 24, 1936

2 Claims. (Cl. 88—24)

This invention pertains to a viewing or monitoring system for photophonographic recording apparatus. Although the system may be used in sound reproducers, optical monitoring of the reproducing beam is not customary, whereas it is essential in recording.

The characteristic feature of my invention is that the physical slit and the slit image on the film can both be simultaneously observed in a single eye-piece or ocular.

Another feature of the invention involves the provision of a novel form of light-dividing prism having a layer of transparent selectively reflecting material therein which transmits the larger portion of the light and reflects only a sufficient amount for observation. In addition, this light-dividing prism has one or more of its faces curved to serve as reflectors of predetermined focal length, so as to properly focus the image of the slit in the ocular.

Another feature of the invention is to cause the prism to serve also as a lens in the optical system.

One object of the invention is to provide a novel monitoring means for photophonographic apparatus.

Another object of the invention is to provide a novel light-divider.

Another object of the invention is to provide a monitoring device wherein the recording slit and the image thereof may be simultaneously observed.

Another object of the invention is to provide means for focusing the images of the recording slit and the image thereof on the film in the same plane in the ocular.

Other and incidental objects of my invention will be apparent to those skilled in the art from a reading of the following specification and an inspection of the accompanying drawing, in which Figure 1 is a diagrammatic illustration of my monitoring system including a light-dividing prism, and Figs. 2, 3 and 4 illustrate modified forms of the light-dividing prism.

Referring first to Fig. 1:

Approximately modulated recording light, either from a variable intensity source or from a secondary source, so controlled as to move the light beam, is directed onto a slit indicated at 1. Light passing through this slit is focused onto the film 2 by the objective lens 3, after passing through the prism 4. The prism 4 includes a diagonal reflecting layer 5, which is composed of a transparent reflecting material preferably selected so that the characteristic curves of (a) the spectral distribution of light, (b) the curve of sensitiveness of the film, and (c) the curve of sensitiveness of the eye, intercept. In other words, this reflecting layer should have such transmission that a comparatively large amount of actinic light (or whatever type of light the film is particularly sensitive to) is allowed to pass through to the film. In the case of a non-orthochromatic film, for example, the layer should have a high transmission in the blue end of the spectrum, while if a panchromatic film were used, this selective transmission would not need to be so sharply defined. On the other hand, the reflecting power of the film should be greatest in the portion of the spectrum to which the eye is particularly sensitive, as, for example, the green.

A suitable material for the reflecting layer can be chosen from the well-known filter materials, according to the characteristics of the film with which the apparatus is to be used.

This reflecting layer 5 reflects the light from the image on the film 2 which is directed back to the prism by the lens 3 toward the ocular 10; and the objective 3, together with the slight refracting power of the curved surface 7 of the prism 4, focuses an image of the line on the film onto the screen or reticule 9 of the ocular.

The curvature of the surface 7 is so chosen that its center falls at the point 8 at one end of the slit 1. Since this surface acts as a reflector, according to the well known characteristics of concave reflectors, it tends to form an image of the slit adjacent the slit. However, a portion of this light is intercepted by the layer 5 and reflected to the viewing screen 9, which is at the same optical distance as the slit 1, and an image of the slit 1 is thereby formed on the screen or reticule 9.

Due to the center of curvature of the surface 7 being at one side of the slit 1, as indicated at 8, the image of the slit 1 and the image of the line on the film surface are slightly displaced from each other in the plane of the paper and the images, therefore, appear side by side.

The surface 7 of the prism 4 is also so curved that its center falls at the point 8 and since the light from the slit 1 is diverging and the surfaces 6 and 7 are perpendicular to all the diverging rays, no reflection of the diverging beam occurs.

The surface 11 of the prism is preferably either frosted or blackened, or both, in order that no reflection may occur at this surface, as any such reflections might disturb the recording or confuse the images in the ocular 10.

The material in the reflecting layer 5 is preferably so chosen as to transmit approximately 95% of the light from the slit 1 to the film 2. The material is preferably such that in the portion of the spectrum which acts most strongly on the film, i. e., the short wave light, the transmission is materially more than 95%, while for the visible light, such as the yellow and green, the reflection may be more than 5%, as, for example, 7%.

In addition to the preferred form of the invention shown in Fig. 1, I have also illustrated some special forms and applications of the invention wherein the reference numerals of the corresponding parts are the same as in Fig. 1. These modified forms pertain only to the construction of the prism, the remainder of the parts remaining substantially unaltered.

In Fig. 2, the prism is substantially identical with that in Fig. 1, except that the curved surfaces 6 and 7 are not ground directly on the prism, but instead, consist of lenses of corresponding curvature cemented to the surfaces of the prism. In addition to this, in order to have a perfectly symmetrical system in each direction, the additional curved surface 6 is provided on the side on which the light emanates to the ocular, and there will, therefore, be the same optical relation between the curved surface 7 and the ocular 10 as between the surface 1 and the slit 1.

In Fig. 3, the position of the film is displaced 90 degrees, being in alignment with the ocular rather than with the slit 1. In this case, the reflection of the intermediate layer 5, is selected in such a way that 95% of the light incident from the direction of the arrow I is reflected on the film in the direction of the arrow II. The light reflected by the film passes through the reflecting intermediate layer 5 to the screen 9.

In Fig. 4 there is also shown an arrangement in which the course of the rays is bent between the slot 1 and the film 2. In this arrangement, the same prism is used as shown in either Fig. 1 or Fig. 2, excepting for the fact that an additional prism 12 is provided for deflecting the light ray from the direction I to the direction II. With this arrangement, the lens 7 is arranged at the additional prism 7 instead of at the double prism.

Having now described my invention, I claim:

1. An optical system of the class described including a slit, an objective adapted to focus an image of said slit upon a film and a double prism between said slit and said objective, said double prism having a diagonal light-dividing surface adapted to reflect light reflected from said film through said objective to a viewing screen and a convexly curved surface on the face towards said objective of such curvature as to focus an image of said slit on the same viewing screen and in the same focal plane as the reflected image is focused by said objective, said double prism having a concave surface toward said slit of such curvature as to provide, in combination with said convex surface, substantially zero refracting power.

2. An optical system of the class described including a slit, an objective adapted to focus an image of said slit upon a film and a double prism between said slit and said objective, said double prism having a diagonal light-dividing surface adapted to reflect light reflected from said film through said objective to a viewing screen and a convexly curved surface on the face towards said objective of such curvature as to focus an image of said slit on the same viewing screen and in the same focal plane as the reflected image is focused by said objective, said convex surface having its center of curvature to one side of said slit whereby the image of said slit and the image from said film are slightly displaced from each other.

KARL SCHWARZ.